(12) United States Patent
Nelson et al.

(10) Patent No.: US 7,529,802 B2
(45) Date of Patent: May 5, 2009

(54) METHOD FOR PERFORMING MULTIPLE HIERARCHICALLY TESTS TO VERIFY IDENTITY OF SENDER OF AN EMAIL MESSAGE AND ASSIGNING THE HIGHEST CONFIDENCE VALUE

(75) Inventors: Mathew A. Nelson, South Boston, MA (US); Matthew N. Roy, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 10/869,111

(22) Filed: Jun. 16, 2004

(65) Prior Publication Data
US 2006/0031319 A1 Feb. 9, 2006

(51) Int. Cl.
*G06F 15/16* (2006.01)
(52) U.S. Cl. .................. 709/206; 709/223; 709/224
(58) Field of Classification Search ............ 709/206, 709/223, 224, 245
See application file for complete search history.

(56) References Cited

U.S. PATENT DOCUMENTS

| | | | |
|---|---|---|---|
| 6,691,150 B1 | 2/2004 | Yoshino | |
| 2002/0198950 A1* | 12/2002 | Leeds | 709/206 |
| 2004/0068542 A1* | 4/2004 | Lalonde et al. | 709/206 |
| 2004/0249893 A1* | 12/2004 | Leeds | 709/206 |
| 2004/0260778 A1* | 12/2004 | Banister et al. | 709/206 |
| 2006/0031314 A1* | 2/2006 | Brahms et al. | 709/206 |

OTHER PUBLICATIONS

"The Coordinated Spam Reduction Initiative", Microsoft, pp. 1-54 Feb. 13, 2004.
Client SMTP Validation (CSV) draft-ietf-marid-csv-intro-00 http://web.archive.org/web/20040718070805/www.ieft.org/internet-draft-ietf-marid-csv-intro-00.txt Dec. 16, 2004.
Simple Mail Transfer Protocol Jonathan B. Postel 1-46 http://web.archive.org/web/20040210030050/http://www.faqs.org.rfcs.rfc821.html Aug. 1982.
Multipurpose Internet Mail Extensions (MIME) Part One: Format of the Internet Message Bodies http://web.archive.org/web/20040207184253/http://www.faqs.org.rfcs.rfc2045.html Nov. 1996.

\* cited by examiner

*Primary Examiner*—Le Luu
(74) *Attorney, Agent, or Firm*—John E. Campbell

(57) ABSTRACT

The identity of the sender of an e-mail message is verified by performing a plurality of tests on DNS information. The DNS information is based on a client IP address or a sender address. Each test performed has a corresponding intrinsic confidence value representing the degree of confidence the test provides of the sender identity relationship. If multiple tests are successful the test result with the highest confidence value of the hierarchy of confidence values is used. The confidence value is optionally used in subsequent identity tests as specified by the subsequent test.

14 Claims, 10 Drawing Sheets

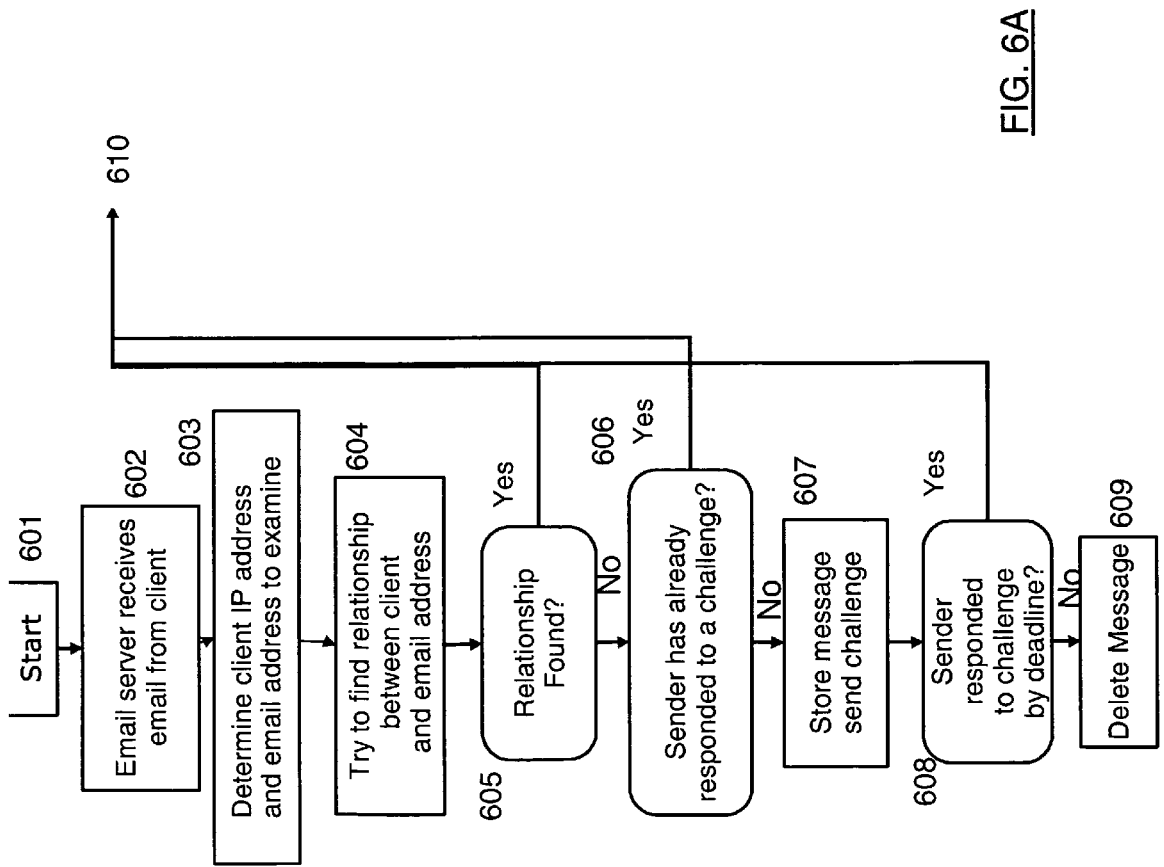

--NEW-- test

--NEW-- test

From: Mat Nelson <mat@ example.com>
To: mat@fairuce.ibm.noblogrid.org

A message from your friendly mail administrator:
example..com sent this mail on behalf of Mat Nelson <mat@ example..com>
How would you like to handle this e-mail in the future? (HELP) —807

—options to accept mail when it arrives via example.COM -
accept mail from Mat Nelson <mat@example.com>
**accept mail from * example.com**
—options to reject mail when it arrives via example.COM -
completely block example.com
example.com is OK, but block mail from Mat Nelson <mat@example.com>

Note: FairUCE converted a portion of this message from plain text to HTML in order to display these options test

FIG. 8

METHOD FOR PERFORMING MULTIPLE HIERARCHICALLY TESTS TO VERIFY IDENTITY OF SENDER OF AN EMAIL MESSAGE AND ASSIGNING THE HIGHEST CONFIDENCE VALUE

FIELD OF THE INVENTION

The present invention is related to computer data handling. It is more particularly related to managing unwanted e-mail.

BACKGROUND OF THE INVENTION

Unsolicited Commercial E-mail, commonly known as "spam", clogs mail servers and e-mail inboxes, costing an estimated $20 billion annually in 2003. Most existing solutions to prevent spam today are based on a content filter, which examines the text of an e-mail and uses a set of rules to determine if the recipient might want to receive it. This is an imperfect art which results in a race between spammers and filter maintainers. The result is unwanted spam passing the filter, and legitimate e-mail being incorrectly tagged as spam.

Another solution, commonly known as "challenge-response" is rarely used because of the large number of cases where it is unreasonable to expect a response to a challenge (mailing lists, legitimate mail from companies the recipient does business with, etc. An example of challenge-response is shown in U.S. Pat. No. 6,691,156 to Drummond et al., and assigned to IBM Corp. and incorporated herein by reference.

Another solution is provided by SPF, or "Sender Policy Framework". SPF is a system for establishing that the identity of an e-mail sender is not spoofed. It works by allowing system administrators for a given domain to publish a record in DNS (an "SPF record") which contains a list of hosts that are "authorized" to send mail from that domain. By looking up this record, the mail server on the receiving end can be sure of whether or not the client attempting to deliver mail is authorized to send mail from that domain.

SPF also has a "best guess" system, which is designed to help establish identity when an SPF record does not exist. The best guess system looks up all A and MX records for the e-mail address's domain, and compares the class C networks of the result with the class C of the client. It also compares the e-mail address's domain name with the client's domain name. The result of all the above tests is either a true, something matched—or false, nothing matched. Sender Policy Framework documentation is found at spf.pobox.com on the World Wide Web.

Another solution, "Caller ID for e-mail" is a MICROSOFT CORPORATION proposed system for verifying sender identity, and is part of MICROSOFT's "CSRI", or Coordinated Spam Reduction Initiative. Domains which want their identity protected can add a record to DNS which mail servers can query to verify the sender's identity. Details about Caller ID for e-mail and CSRI are available at www.microsoft.com/mscorp/twc/privacy/spam_csri.mspx and in HTML format at 216.239.41.104/search?q=cache: iRHopkP-stQJ:spf.pobox.com/caller-id/csri.pdf+ csri.pdf&hl=en and is incorporated herein by reference.

Also, a merged solution between SPF and CallerID for e-mail is being proposed.

DomainKeys is YAHOO CORPORATION proposed system for verifying sender identity. Domains which want their identity protected can post a public key to DNS, then sign all outgoing messages with a private key. Recipients can query DNS, retrieve the public key, and check the signature to verify the sender's identity. Details about it are available at antispam.yahoo.com/domainkeys and is incorporated herein by reference.

Other identity systems are being examined by MARID, or MTA Authorization Records in DNS, an IETF working group created to establish a standard for verifying sender identity. Details on MARID and the identity systems being considered can be found at www.ietf.org/html.charters/marid-charter.html.

Terminology:

Simple Mail Transport Protocol (SMTP)—the standard used today to send mail across the internet. Most e-mail systems that send mail over the Internet use SMTP to send messages from one server to another; the messages can then be retrieved with an e-mail client using either POP or IMAP. In addition, SMTP is generally used to send messages from a mail client to a mail server. Defined in RFC 821 "Simple Mail Transfer Protocol" www.faqs.org/rfcs/rfc821.html by Information Sciences Institute University of Southern California incorporated herein by reference.

SMTP client—a computer which is sending mail across the internet using SMTP.

Mail Server—a computer which accepts connections from SMTP clients and receives e-mail messages for the recipient.

SMTP Transaction—defined as "mail transaction" and "SMTP mail transaction" in RFC 821.

Proxy server—a computer process that relays a protocol between client and server computer systems, by appearing to the client to be the server and appearing to the server to be the client.

SMTP Proxy—a computer process that relays the SMTP protocol (defined in RFC 821) between client and server computer systems.

Domain Name—a name for a computer or group of computers connected to the internet (i.e. example.com, or mail.example.com).

Hostname—A fully qualified Domain Name (FQDN) which represents a single computer connected to the internet i.e. "mail.example.com".

Network Working Group Request for Comments: 1123 (RFC1123) defines and discusses the requirements for Internet host software. It can be found on the internet at "www.c-se.ohio-state.edu/cgi-bin/rfc/rfc1123.html" and is incorporated herein by reference.

Domain Name System (DNS) is the standard used today to find IP addresses, mail servers, and other information for a domain name.

2LDN—second level domain name, i.e. example.com. Occasionally, in the context of this document, this actually has 3 levels, such as example.co.uk Parent Domain—a higher level domain name. For example, mail.example.com is the parent domain of smtp-.mail.example.com.

"A record", "MX record", "NS record"—Different records we can look up in DNS.

An IP address uniquely identifies a computer or network connected to the internet i.e. "192.168.0.34".

A Class C address is a group of 256 IP addresses comprises the first three levels of the IP address, i.e. "192.168.0".

A Class B address is a group of 65,536 IP addresses comprises the first two levels of the IP address, i.e. "192.168".

E-mail, or E-Mail Message—A message sent over the internet from a Sender to a Recipient, consisting of an Envelope and Content, as defined and used in RFC 822 "Standard for the format of ARPA Internet text messages" on the world wide web at www.faqs.org/rfcs/rfc822.html and incorporated herein by reference.

Envelope—Part of an e-mail message which contains whatever information is needed to accomplish transmission and delivery, as defined and used in RFC 822.

Content—Part of an e-mail message which is the object to be delivered to the recipient Header—Part of the e-mail Content which provides information about the e-mail, i.e. Subject, as defined and used in RFC 822.

Body—Part of the message Content which contains the text of the message.

Envelope Sender—Part of the Envelope which specifies the e-mail address an e-mail would be returned to if it were not deliverable. Also known as the "bounce" address.

From address—A Header which specifies the e-mail address which most e-mail clients display, and which replies are generally sent to.

Reply-To address—A Header which specifies the optional e-mail address to which (when present) replies are sent. (This overrides the "from address" for replies, and is often used for mailing lists.)

SUMMARY OF THE INVENTION

It is the goal of the present invention to improve spam management over the prior art by attempting to establish a relationship between the "sender" and the "SMTP Client" using existing and forthcoming technology, then use that relationship as the deciding factor on whether we should accept the mail, reject the mail, or revert to another method such as a content filter or a challenge-response system.

It furthermore a goal to perform a hierarchy of tests to verify the identity of the sender of an e-mail message by receiving a client IP address for an e-mail message from an email sender. Then, receiving a sender address for the e-mail message from the email sender. Then, retrieving DNS information using any one of the client IP address or the sender address. Then, performing a hierarchical plurality of tests on the DNS information, the hierarchical plurality of tests comprising tests having corresponding confidence values representing the degree of confidence of the sender identity. When one or more tests of the hierarchical plurality of tests is successful, a relationship is established between the email sender and the email message, the relationship having the confidence value of the successful test having the highest confidence value.

It is yet another object of the invention to attempt to establish the relationship between the email sender and the email message by performing a test which comprises attempting to compare a domain name of the sender address with a hostname of the client.

It is yet another object of the invention to compare the domain name of the sender address with the hostname of the client by retrieving the client hostname based on the client IP address. Then retrieving one or more IP addresses based on the client hostname. Then determining that the client IP address is one of the one or more IP addresses.

It is still another object of the invention to provide a hierarchical plurality of tests that attempt to find the client IP address in the retrieved DNS information, attempt to find the class "C" of the client IP address in the retrieved DNS information, attempt to find the client hostname in the retrieved DNS information, attempting to find a parent domain of the client hostname in the retrieved DNS information, or attempt to find the class "B" of the client IP address in the retrieved DNS information.

It is yet a further object of the invention to attempt to find the client IP address in the retrieved DNS information test comprises a first confidence value, attempt to find the class C of the client IP address in the retrieved DNS information test comprises a second confidence value, attempt to find the client hostname in the retrieved DNS information test comprises a third confidence value, attempt to find a parent domain of the client hostname in the retrieved DNS information test comprises a fourth confidence value, or attempt to find the class B of the client IP address in the retrieved DNS information test comprises a fifth confidence value.

It is yet another object of the invention to provide a resulting confidence value, the resulting confidence value based on any one of the first, second, third, fourth or fifth confidence value of the successful tests wherein the resulting confidence value is any one of a highest confidence value of a successful test, the confidence value of a first successful test attempted or an arithmetic value derived from all of the confidence values of all successful tests attempted.

It is yet another object of the invention to provide tests on the DNS information comprising testing any one of "NS" DNS records, "MX" DNS records or "A" DNS records.

It is yet another object of the invention to provide a separate test of the hierarchical plurality of tests comprising attempting to determine from the client IP address, a first hostname associated with the client IP address. Then when the first hostname is found, searching IP addresses associated with the first hostname for the client IP address. Then when the searching step finds the client IP address, determining if a second level domain name of the first hostname equals the domain name of the envelope sender address.

It is yet another object of the invention wherein the plurality of tests comprise associating any one of an IP address, a class "B" address, a class "C" address, a hostname or a portion of a hostname.

It is yet another object of the invention wherein when none of the tests are successful performing the further step of any one of accepting the e-mail, delaying the e-mail, rejecting the e-mail or performing a secondary relationship test.

It is yet another object of the invention wherein a secondary relationship test comprises any one of a challenge response or a weighted filter.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 6A, 6B is a flowchart of the operation of a preferred embodiment of the invention;

FIG. 8 is a diagram depicting components of an example e-mail GUI presentation.

The detailed description explains preferred embodiments of the invention, together with advantages and features, by way of example with reference to the drawings.

DESCRIPTION OF THE PREFERED EMBODIMENTS

Figure 1:
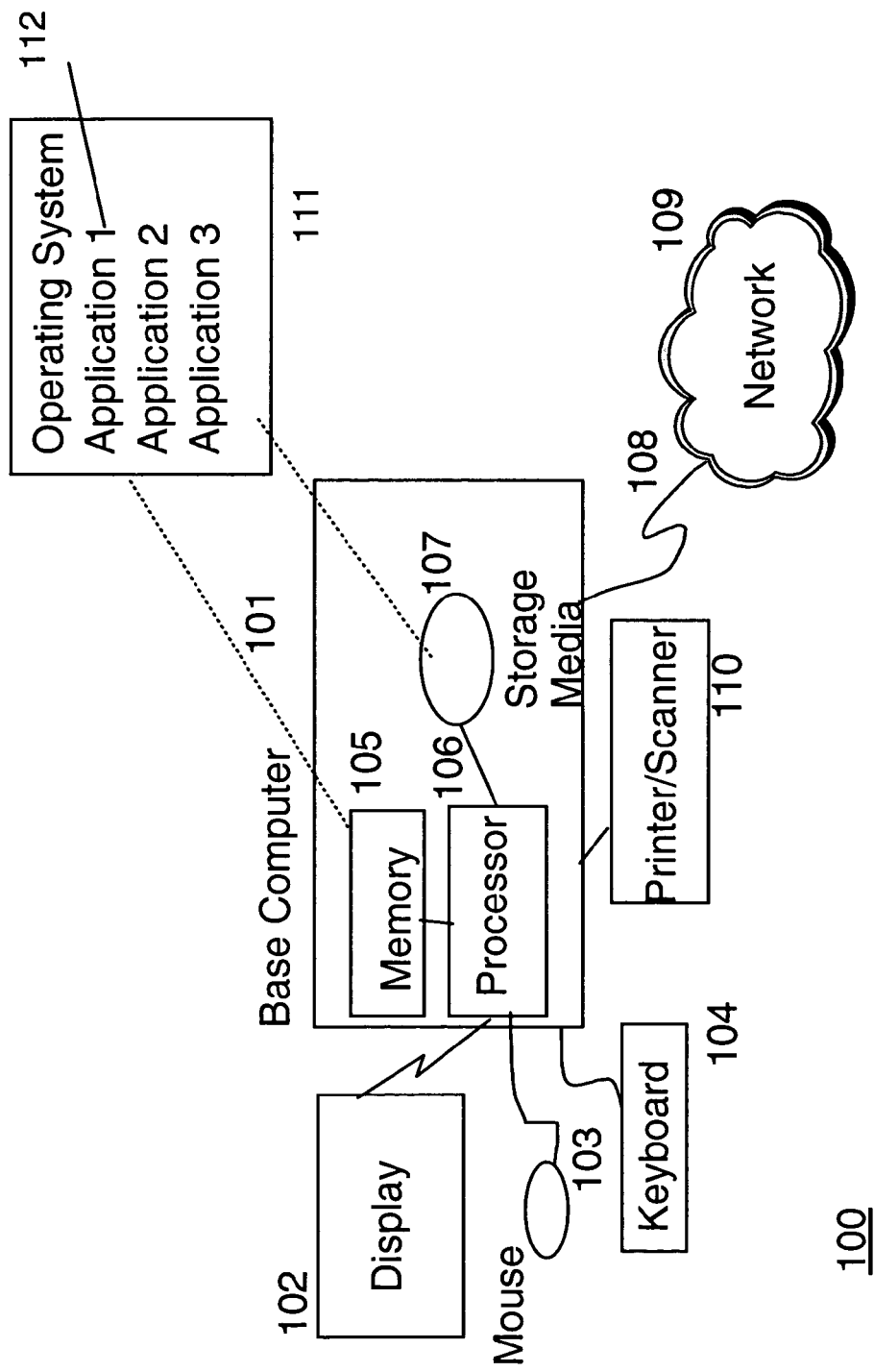
FIG. 1 depicts components of a prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
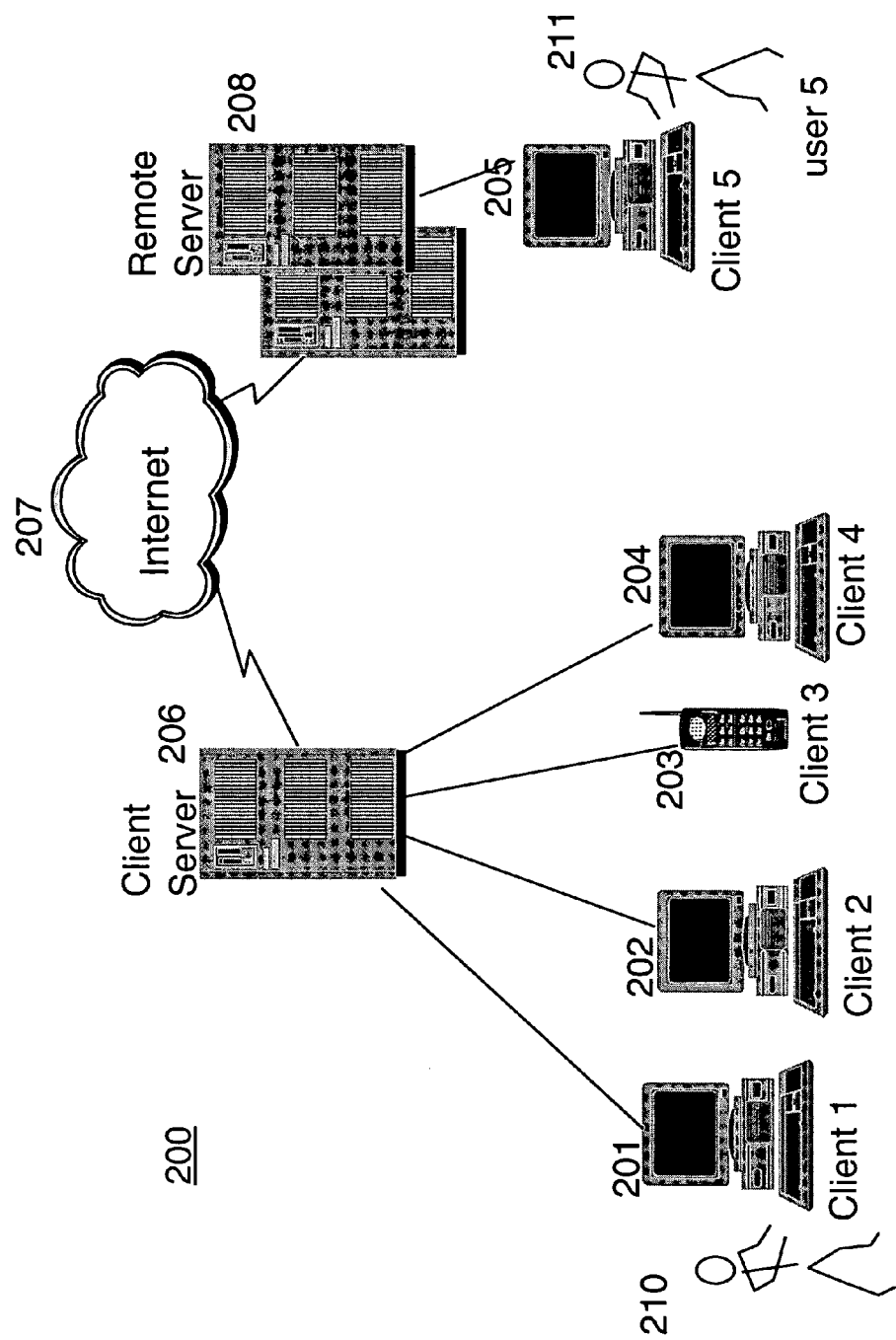
FIG. 2 depicts network components of a prior art network.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zServer 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In a preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The present invention is preferably implemented as a SMTP Proxy, or as a separate computer program which runs after the Mail Server has received an e-mail, but before the Mail Server has delivered the e-mail to the recipient.

The present invention is novel over the SPF Best Guess system in the following ways:

1. The present invention can be more precise. Because it is hierarchical, better matches provide more confidence that the sender is legitimate.
2. The present invention is more forgiving. Because it is hierarchical, we can allow the client to match up to a class B—not as good as a class C match, but a number of large domains will only match on class B. Also, we look up NS records in an attempt to determine if the sender is the ISP of the domain in question; for instance, mail-.aaa.com sending mail from bob@bbb.com would match, if aaa.com also provided nameservice (DNS) for bbb.com. We also look up parent domains. For instance, for exampleuser@us.ibm.com, SPF would only look up information for us.ibm.com, but would ignore information from ibm.com. Because we are hierarchical, we can safely look up ibm.com also for a not-as-precise match.

3. SPF's Best Guess system cannot distinguish between a domain with a single IP address, and someone in the same class C as that domain (because of #1).
4. SPF's Best Guess system can miss legitimate senders in large domains where the client is in a different class C than the domain's mail servers and other hosts, and it can miss legitimate senders where the client is within a parent domain of the e-mail address (because of #2).

Figure 3:
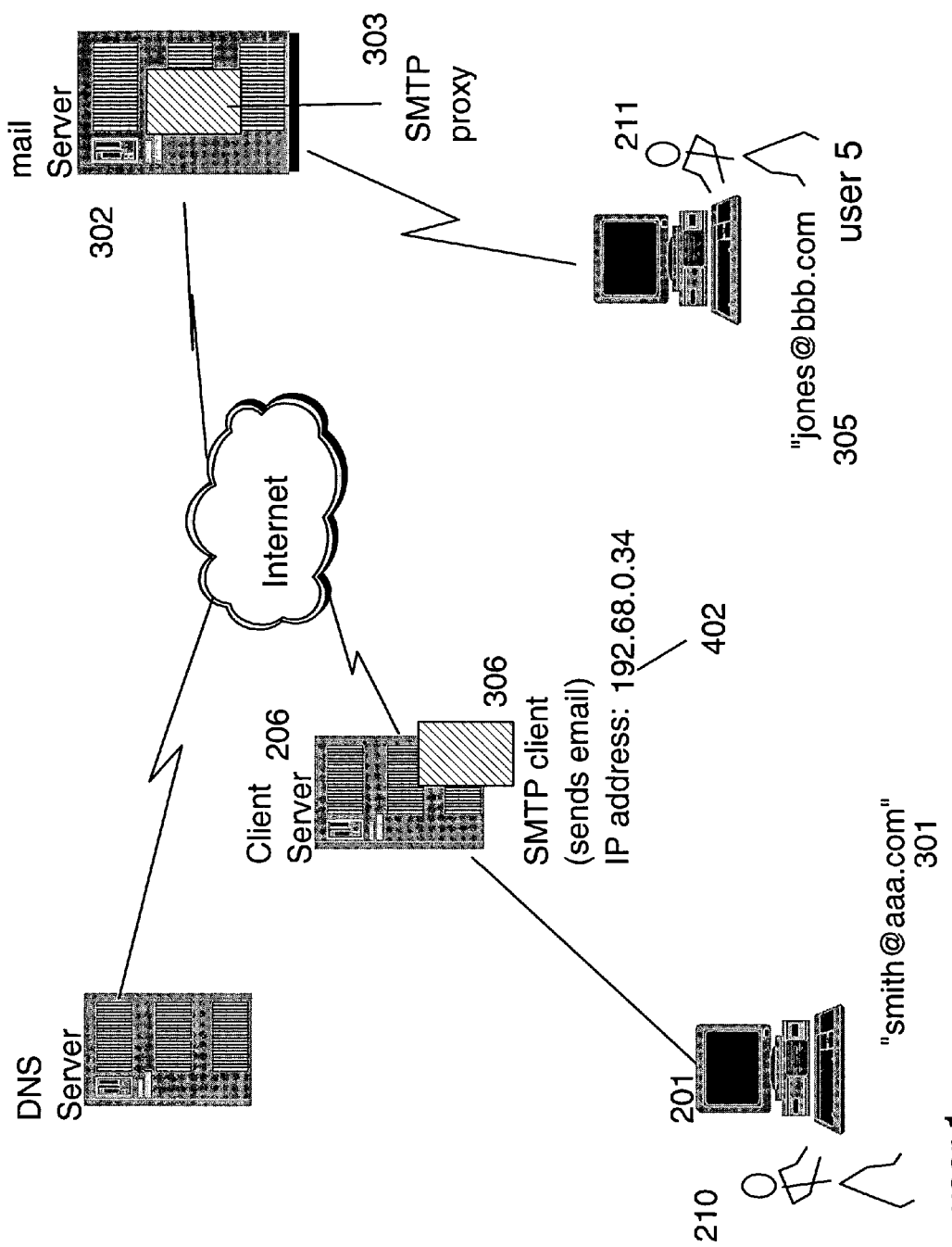
FIG. 3 depicts an example SMTP network according to the present invention.

FIG. 3 depicts an example path for an e-mail transmission. A user 210 having an e-mail address of "smith@aaa.com" 301 composes an e-mail message directed to another user 211 having an e-mail address of "jones@bbb.com" 305. An SMTP client 306 establishes a TCP/IP connection with mail server 302. The Mail server accepts a connection from the IP address of client "192.168.0.34". The client sends an e-mail envelope through the connection comprising the e-mail address of the sender "smith@aaa.com" 301 and the e-mail address of the receiver "jones@bbb.com" 305 to the mail server 302. The mail server permits the SMTP client 306 to send the e-mail message content if it recognizes the receiver's e-mail address 305.

The mail server in accepting a connection sees IP address 192.168.0.34 is trying to connect to it. The mail server accepts the connection from "192.168.0.34". This happens before anything is "sent", and is how the mail server captures the IP address. From there, the mail server sends the IP address to a preferred embodiment in any number of ways.

Figure 4:
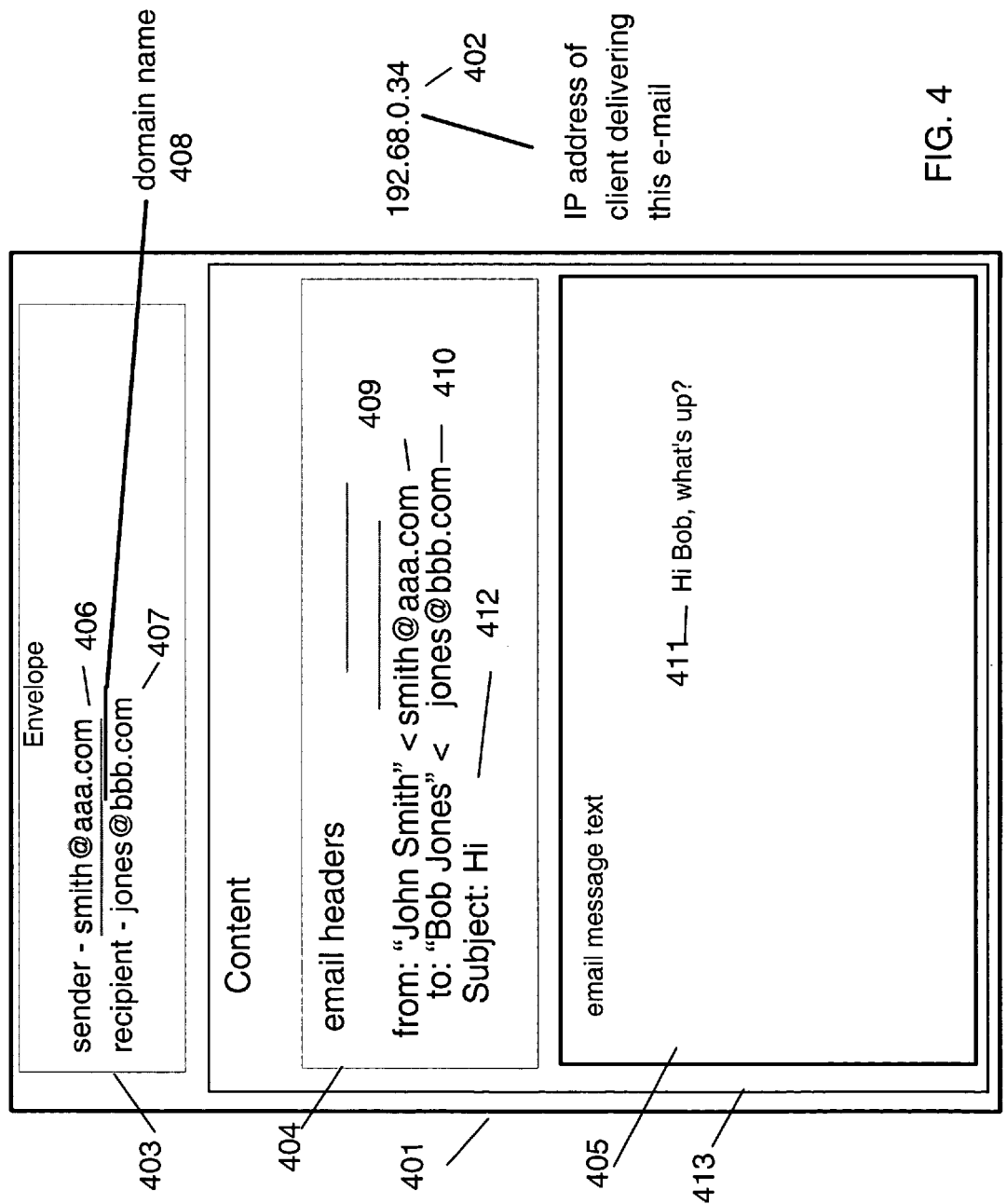
FIG. 4 depicts components of an e-mail message transaction.

Components of an e-mail message (FIG. 4) from an SMTP client 306 having an Internet Protocol (IP) address (192.168.0.34) 402 preferably comprise an envelope 403, an e-mail header 404 and the e-mail message content 405. The envelope comprises the address of the sender "smith@aaa.com" 406 and recipient "jones@bbb.com" 407. The header comprises a from address "smith@aaa.com" 409, a "to" address 410 "jones@bbb.com" and a Subject "Hi" 412. The message content comprises a text message "Hi Bob, what's up?" 411.

In a preferred embodiment an e-mail server 302 receives e-mail and attempts to verify the identity 406 of the sender.

In a preferred embodiment, the identity of the sender to be verified is the e-mail address of the sender 406.

In a preferred embodiment, the e-mail address 406 of the sender is the envelope 403 sender from the SMTP transaction. If this address does not exist, such as for a bounce e-mail, then the e-mail address is found in the "from:" header 409 in the e-mail. In another embodiment, the e-mail address may be found in a "reply-to:" header, or other headers 404.

The client is determined by finding the IP address 402 of the computer 306 which delivered the e-mail. The method for doing this depends on which Mail Server architecture is being used. In a preferred embodiment, the address is usually retrieved from an XFORWARD command in the SMTP transaction between the mail server and the SMTP proxy. In some cases, such as when we know the e-mail was forwarded to us from a known client, the IP address may be stored in a "Received:" header 404 in the e-mail itself.

In a preferred embodiment (FIG. 5), an e-mail server 302 receives an e-mail 502 and attempts to authenticate the e-mail by verifying the identity of the sender 510. If the relationship is found 503 the e-mail is further processed 505 by any one of blacklist, whitelist, voting, domain reputation, content filtering or other techniques known in the art. The e-mail is optionally marked up with GUI options 506 and the verified e-mail is presented to the user 506. If the identity could not be verified 503, the e-mail is further processed by any one of challenge-response, content filtering or other techniques known in the art.

In a preferred embodiment, an e-mail server attempts to verify the identity of the sender by finding a relationship between the e-mail address of the sender and the IP address of the client.

Figure 6B:
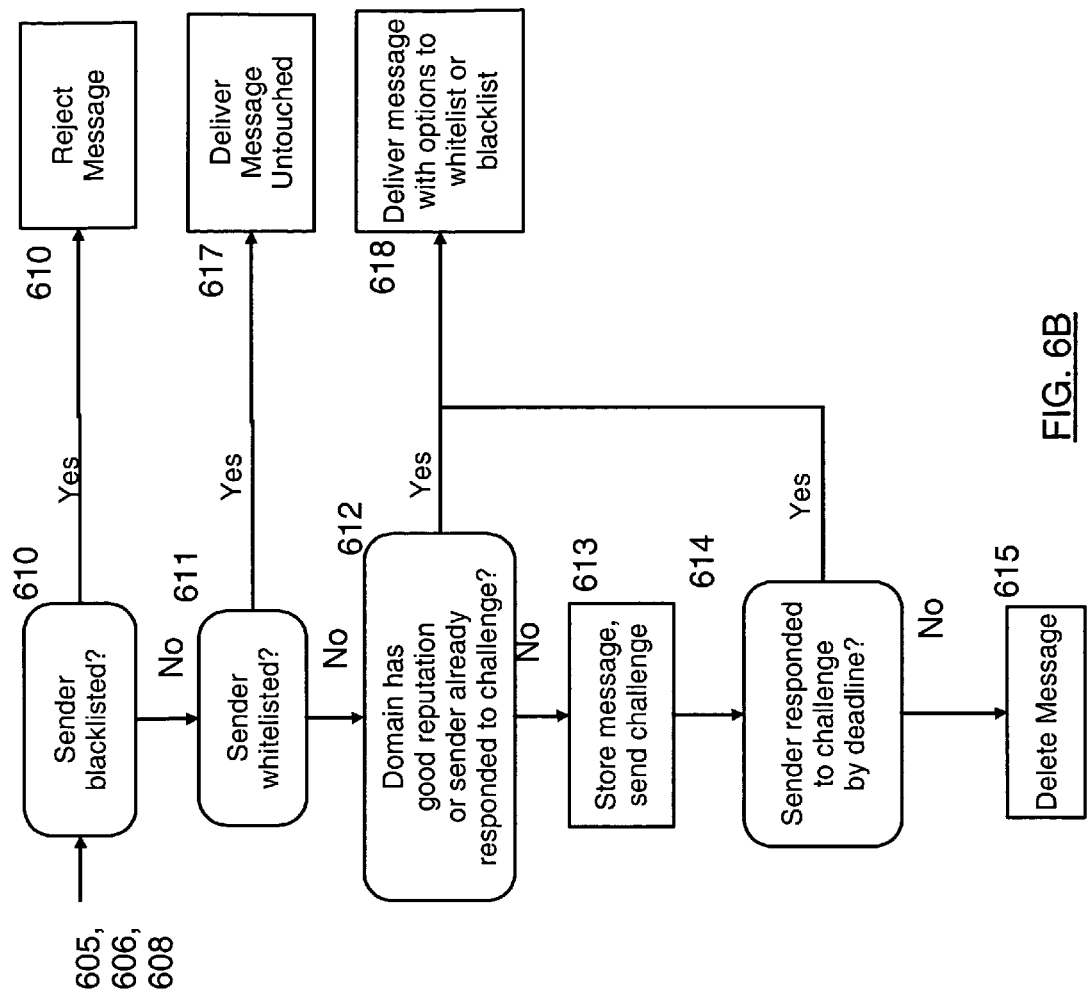

In a preferred embodiment (FIGS. 6A, 6B) an e-mail server 302 receives 603 e-mail 401 from an SMTP client 306, forwarding each line of the transaction to an SMTP proxy. The proxy 302 determines 603 the client IP address 402 and the e-mail (sender) address 301 to examine. The proxy 302 tries 604 to verify the identity of the sender by finding a relationship between the e-mail address 301 and the SMTP client 306 preferably by the method shown in FIGS. 7A, 7B. If 605 a relationship is found the e-mail is further processed by rejecting 616 the e-mail if blacklisted 610; delivering 617 the e-mail if whitelisted 611; delivering 618 the message with GUI options if any one of the domain has 612 a good reputation, the sender has responded to a challenge by a deadline 614. If the sender has not responded to a challenge by a deadline, the message is deleted 609 615.

Figure 7A:
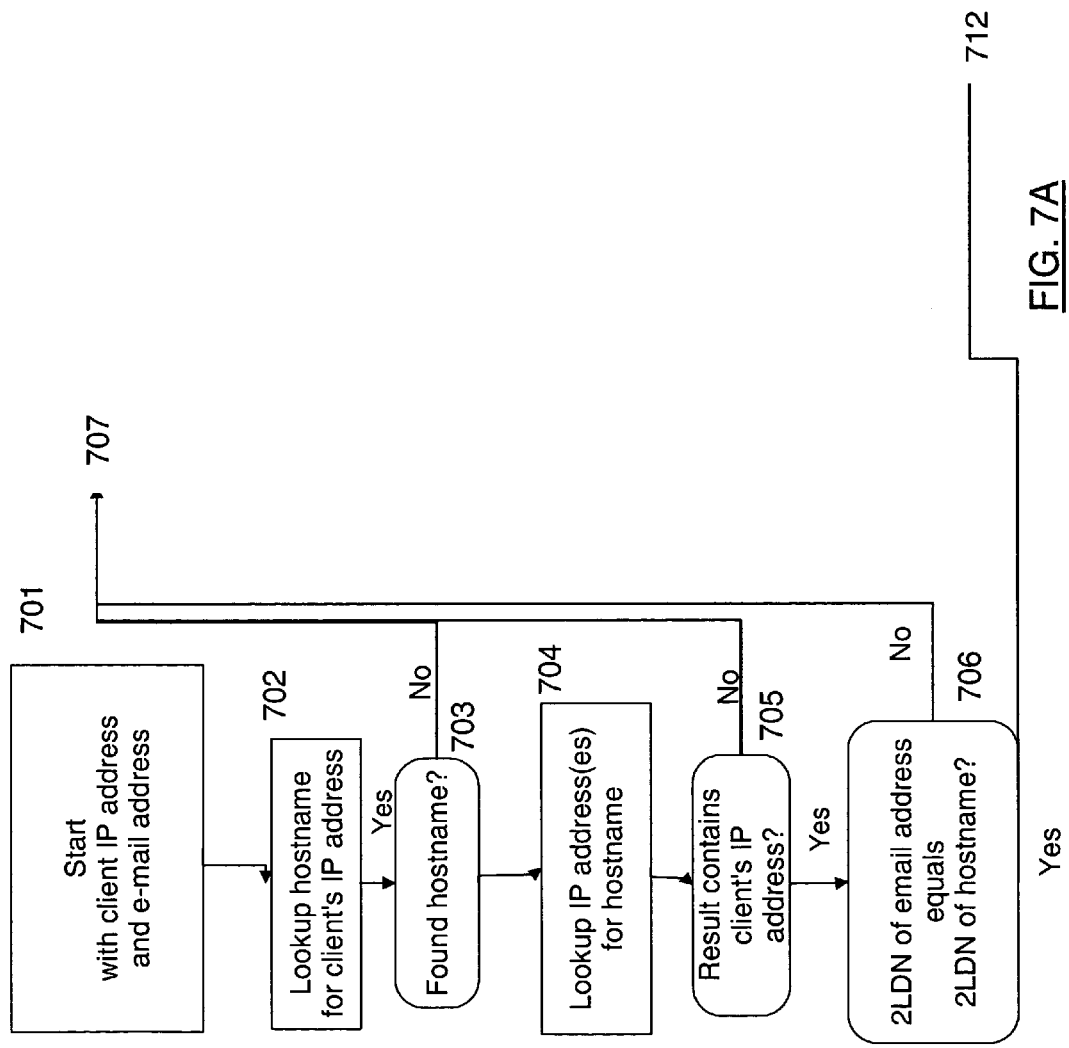
FIGS. 7A, 7B is a flowchart of the operation of a preferred embodiment of the invention.
Figure 7B:
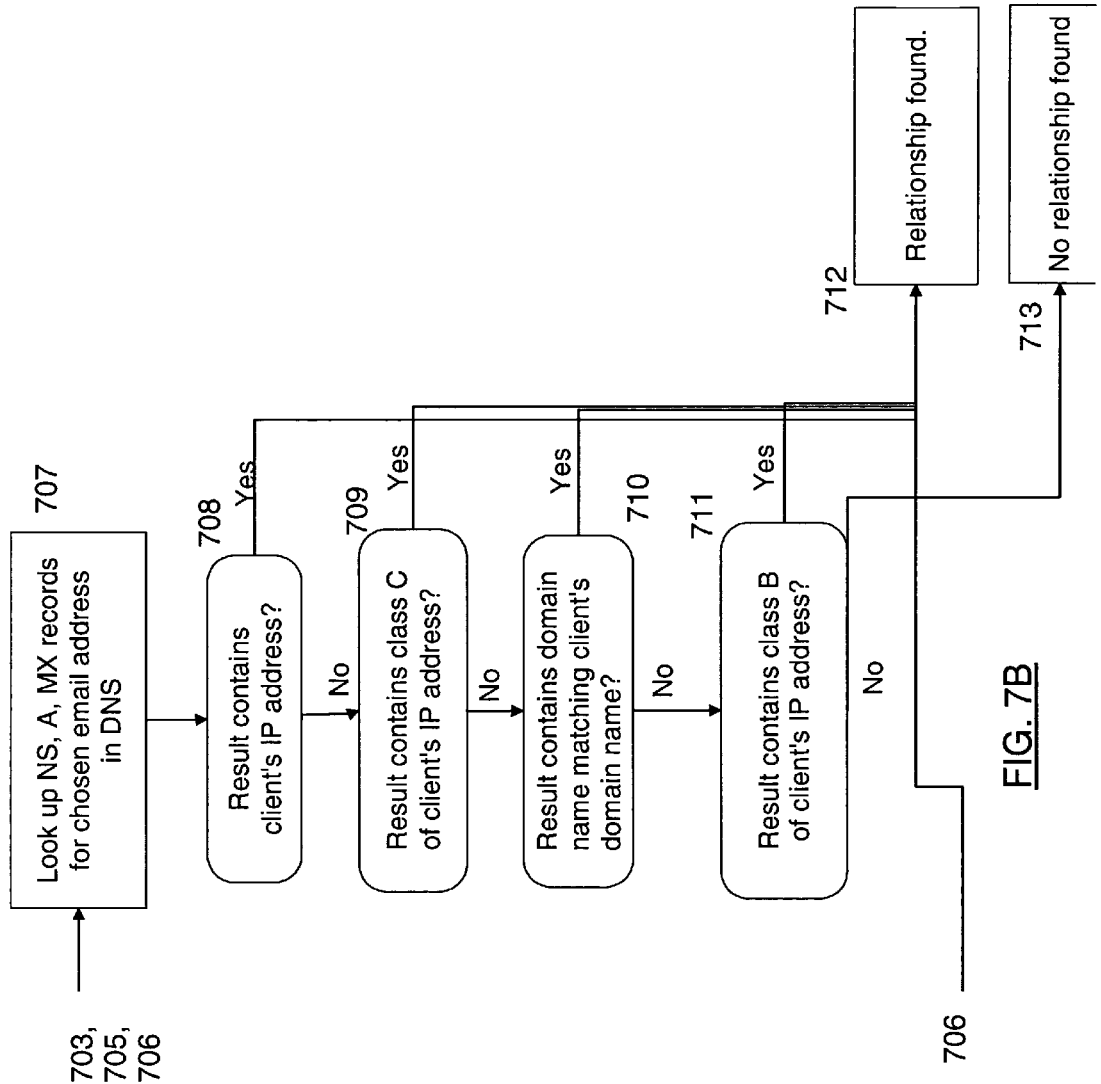

FIGS. 7A, 7BA, 7B depict a preferred method for finding a relationship. An e-mail envelope 403 is received 701 providing an SMTP client 306 IP address 402 and an e-mail sender address 301. A lookup 702 of the hostname of the IP address 402 is performed for the client 306 IP address preferably with a DNS server. If 703 no hostname is found, an alternate method 707-711 is used. If 703 the hostname is found, IP addresses are looked-up 704 for the hostname. If 705 these IP addresses include the SMTP client 306 IP address 402, and 706 the 2LDN of the e-mail address 706 "aaa.com" is also the hostname's 2LDN, a relationship is found 712, otherwise an alternate method 707-711 is used. The alternate method searches 707 for the e-mail addresses 301 in NS, A, or MX records in a DNS server. A relationship is found 712 if 708 the result contains the client's IP address 402; the result contains 709 the class C of the client's IP address 402; the result contains 710 the domain name matching the SMTP clients domain name, or the result contains 711 the class B of the clients IP address. Otherwise, no relationship is found 713.

In a preferred embodiment, the identity of the sender is verified by finding a relationship between the client 306 and the sender 301 using the method shown in FIGS. 7A, 7B. In another embodiment, the identity of the sender is verified using other well-known sender identity methods, such as SPF, DomainKeys, or CallerID. In another embodiment, the identity of the sender is verified using a well-known sender identity method, but falls back to the method shown in FIGS. 7A, 7B if other methods do not apply, such as when SPF records do not exist.

If the identity of the sender cannot be verified, then the sender of the e-mail is sent a challenge, and the e-mail is stored without being delivered. The challenge may contain a digitally signed link for the sender to click on in order to respond. The link takes the sender to a webpage where he/she can respond, preferably by typing in a string shown as a graphic, or any other system to prove he/she is human. In another embodiment, the e-mail is returned to the sender without being stored. In another embodiment, the e-mail is processed by a content filter with a low tolerance for spam.

In a preferred embodiment, if no relationship is found, and no challenge has been responded to within a specified amount of time, then the e-mail is deleted without delivery.

Once the identity of the sender has been verified or a challenge has been responded to, the domain which is responsible for sending the e-mail is known. Optionally, the relationship can have a strength based on how likely it is that the domain is responsible. Once which domain is responsible is found, the e-mail is further processed using whitelist/blacklist and domain reputation. In another embodiment, the e-mail is further processed by a content filter with a higher tolerance for spam.

In a preferred embodiment, domain reputation is based on the date the domain was registered, via an automatic "whois" lookup. In another embodiment, domain reputation is based on user voting. In another embodiment, domain reputation is based on looking up the domain name on an internet registry designed for this purpose.

In a preferred embodiment (FIG. 8), the user is presented with options to facilitate the further processing. The options 809 810 812 813 are embedded in the e-mail 801 itself for use with a standard e-mail client, in the form of URL links. In another embodiment, the options are presented to the user through a customized e-mail client, or a plugin to a standard client designed to display the options in a GUI.

In a preferred embodiment, the options include, but are not limited to, options to whitelist 808 809 or blacklist 812 813 the sender. The options include patterns on e-mail addresses or patterns on SMTP client hostnames. The options may include information from other parts of the e-mail message, such as the "from:" header. For instance, the user is presented options to accept mail from a particular "responsible domain", only when the "from:" address is from a particular domain (i.e. Accept mail from "exacttarget.com" only when it says "from homedepot.com"). The options include specific e-mail addresses as well as domains, hostnames, or 2LDNs. In another embodiment, the options include options to vote the e-mail as spam or not-spam, thus helping to establish the reputation of the domain responsible for sending the e-mail.

In an embodiment, the options are ordered in such a way that the recommended options are listed first. In another embodiment, the options are much simpler, such as an option to vote an e-mail as spam, or simply options on whether to accept or reject e-mail from the domain In a preferred embodiment, the user is given the option to receive copies of e-mail which was challenged. The copies include an option to respond to the challenge on behalf of the sender. The subject line of the copies 804 is marked-up, allowing the user to filter the messages as desired.

In a preferred embodiment, an attempt is made to verify the identity of the sender to discover a relationship between the client and the e-mail address according to the following steps, as shown in FIGS. 7A, 7B:

1. Look up the hostname 702 for the client's IP address 402, (if any) using a reverse DNS lookup. We may get an FQDN.
2. If there is a hostname (FQDN), look that up 702 in DNS to capture any other IP addresses for that hostname VIA round robin DNS. Also, attempt to verify that the hostname resolves to the client's IP address. If the hostname does not resolve back to the client's IP address 703, we treat that as not having a client hostname.
3. If this hostname exists 704, compare 706 the 2LDN of the e-mail address with the 2LDN of the hostname. If a match is found, a relationship has been established 712. (For instance, comparing user@example.com to mail.example.com is a match).
4. Look up 707 the domain and parent domains for the e-mail address in DNS, to find NS, A, and MX records. Build a list of hostnames and class B IP addresses from the results.
5. Compare the client's IP address(es) and domain name(s) to the list we just built, to find matches (optionally up to 2LDN) if any. The match can be an IP address match 708, a class C match 709, or a class B match 711. The match can also be a 2LDN match, i.e. mail.exampleISP.com is the client, the e-mail address is user@myexample.com, and myexample.com has ns.exampleISP.com in a NS record. If no match is found 713 take appropriate action.
6. Select the best match, if any exist (Relationship found 712). (For instance, an IP address match is better than a "class C" match, and a "class C" match is better than a "class B" match.)

In a preferred embodiment example, the envelope sender address is compared with the client hostname, (not the client IP address). An envelope sender address exampleuser@us.ibm.com is compared with the client hostname e4.ny.us.ibm.com. The client hostname e4.ny.us.ibm.com is retrieved by looking up the client IP address 32.97.182.104 in DNS, then e4.ny.us.ibm.com in DNS is checked to make sure it returns 32.97.182.104. This approach is hierarchical in that e4.ny.us.ibm.com is a stronger (higher confidence) match for exampleuser@us.ibm.com than, say, mtagate1.uk.ibm.com would be, because of the "us.ibm.com" parent domain.

Advantages Over Content Filters:

Spammers can defeat content filters by examining the rules the filter uses, and carefully crafting an e-mail to get around them. The present invention uses only the client IP address, and DNS lookups which the spammer does not control, or other sender identity systems which the spammer does not control.

The present invention is not a content filter. All e-mail for which a relationship between the sender and the client can be found is considered valid. Once the tests are passed, a user can do whatever he likes, secure in the knowledge that he knows the domain he's dealing with. For instance, he can choose not to accept any e-mail from that domain, or patterns of e-mail addresses. Or he can choose not to accept any e-mail from DHCP clients in that domain, or client hostnames which match a pattern. Or he can choose not to accept e-mail from any domain created in the past X days, months or years. He can also run his accepted e-mail through a spam filter if he so chooses. The present invention empowers the e-mail user, and gives control of which senders have access to his inbox back to him.

An advantage of the present invention is that, in the event the identity of the sender cannot be verified, valid senders do receive a challenge allowing them to respond. This is preferable to the prior art wherein a user unknowingly deletes a legitimate e-mail because it was incorrectly identified as spam, or a legitimate e-mail is deleted by a spam filter without the user ever seeing it.

In the past, content filters had to work with each e-mail individually, drawing a fine line between "spam" and "not spam". With the present invention, a user can adjust that line based on a domain's reputation. For instance, mail arriving from yahoo may be tagged as spam only if a content filter shows a 90% probability that it is spam, while for spamoffers-example.com the user may tag it as spam if a content filter shows even a 25% probability that it is spam.

Advantages Over Challenge/response Systems:

An advantage of the present invention is that most legitimate senders are not challenged. This is preferable to the prior art wherein all senders are challenged, including senders who are unlikely to respond such as mailing lists, or legitimate bulk mailers.

Advantages Over Whitelist/blacklist Systems:

In the past, a user may have whitelisted the e-mail address "friend@yahoo.com". In this case, he would have accepted mail from "friend@yahoo.com" no matter where it came from even if it's a virus running on a comcast.net computer connected to a cable modem, or a spammer who somehow found out that the user whitelisted "friend@yahoo.com".

With the present invention, when the user whitelists the same e-mail address, he is whitelisting it only if yahoo.com is delivering it.

Another advantage of the present invention is related to "phishing", a term which describes sending e-mail with a false e-mail address, with the intent to con an unsuspecting user into providing a credit card number or other sensitive information. With this invention, the user is made aware that the sender is most likely not legitimate.

Advantages Over Existing Sender Identity Systems:

Existing sender identity systems, such as SPF records (spf.pobox.com) and others, are a great solution for domains which support them ("mail from user@example.com must come from one of these n servers at example.com"). Unfortunately, not all domains can, or will, use such identity systems. The present invention is designed to fill in that gap. It can be used whether or not other identity systems exist.

In a preferred embodiment, the present invention does not actively probe the client to test if it is not an open relay, nor does it establish a connection to any mail server to see if an e-mail to the sender would be deliverable. The only connections made are DNS lookups and, optionally, whois lookups. In a preferred embodiment, both lookups are cached both in memory and on disk.

Advantages Over Reputation Systems:

Lists of IP addresses which are known to send spam (commonly known as RBLs) only work after an IP address is marked as having sent spam. At this point it is often too late, especially considering the proliferation of viruses which take over computers in order to become spam relays.

Advantages Over Voting Systems:

Assume there are 100,000 people, and they each receive 10 e-mails with a yahoo.com address, and that 8 of them are spam, simply pretending to be from yahoo, but not sent by a yahoo server. The other 2 are legitimate e-mails sent by yahoo.

In the past, if those people voted on what percentage of yahoo.com e-mail was spam, the result would likely be around 80%. (8 of the 10 messages they each received were spam).

With the present invention, the vote is only on the 2 e-mails which actually came from yahoo, so the result would be closer to 0% . . . a much more realistic estimate on the amount of spam yahoo itself is responsible for.

Prototype:

The prototype embodiment is written in Java, and runs as an SMTP proxy between instances of Postfix. This optionally allows one to block spam at SMTP time, without queuing the message for delivery. Thus, few resources are wasted on the server.

In a preferred embodiment, challenges and rejections are sent as a new bounce e-mail which is customizable by the user. In another embodiment, e-mail rejection is done with an SMTP error response, i.e. "550 Please take me off your list" when possible, so that the client is responsible for sending the challenge or bounce. Rejection decisions are made per recipient.

Preferably there are multiple internal instances of the mail server running on the inside of the proxy, so accepted mail, and challenged mail can use different servers on the inside. This way, any delays resulting from sending challenges will not affect normal e-mail delivery.

Marking Up the Message:

Marking up the message can be done in any way that works for the particular application. One might, for instance, pre-append [ProbableSpam] to a message this is determined likely to be Spam.

Figure 5:
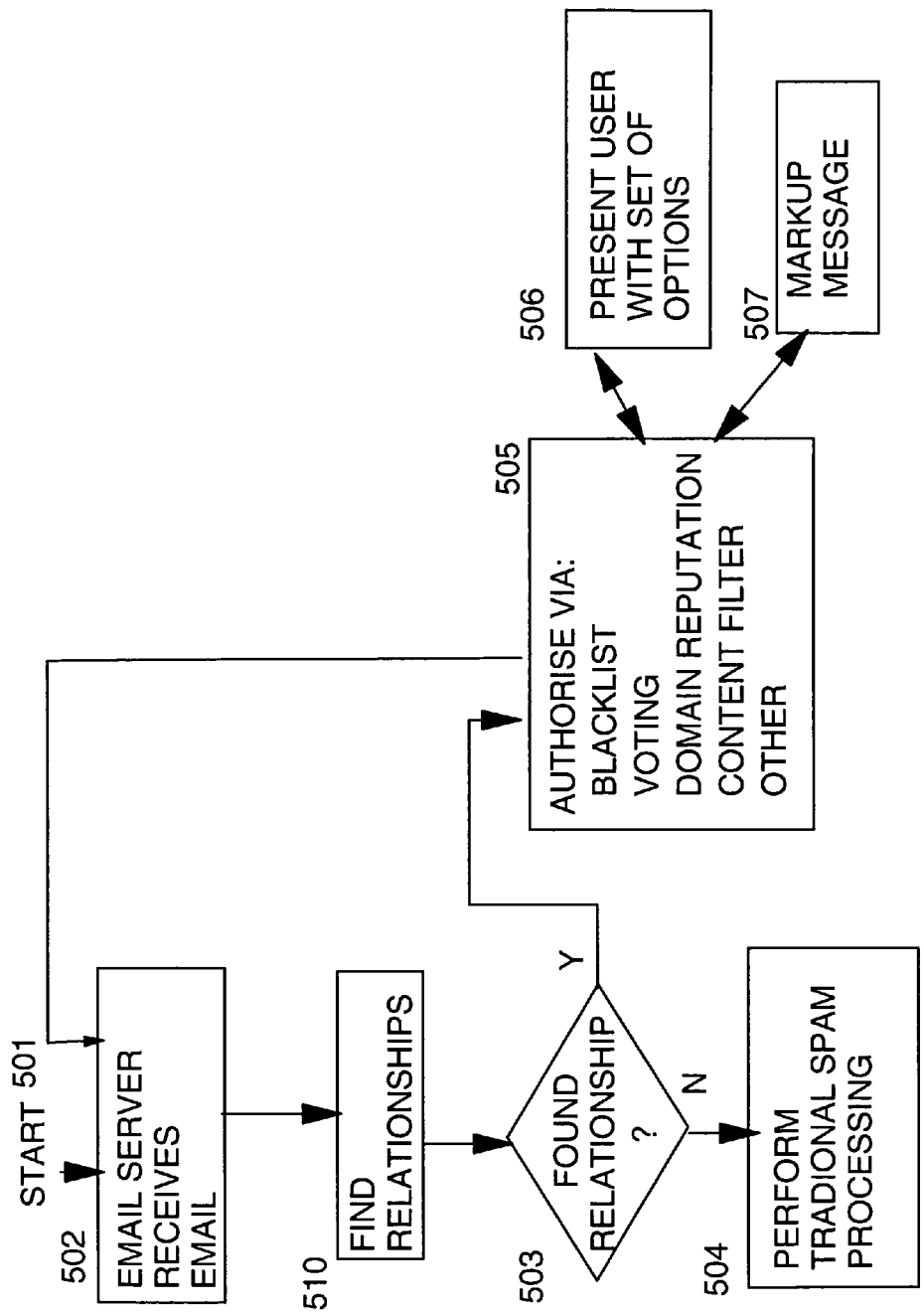
FIG. 5 is a flowchart showing the operation of a preferred embodiment of the invention.

Preferably the markup function inserts content into the e-mail to present whitelist/blacklist options to the recipient so that the system can be used with a standard e-mail client. When an e-mail arrives from a sender they have not seen before, they have clickable options as shown in FIG. 5. Preferably options are presented through a GUI in a customized e-mail client. In one embodiment, the GUI options are embedded in the e-mail by inserting a new Mime part, or creating a new Mime part. In another embodiment the GUI options are embedded in the e-mail by modifying an existing Mime part. Mime is described in RFC 2045 Multipurpose Internet Mail Extensions (MIME) Part One: Format of Internet Message Bodies from the Network Working Group found on the World Wide Web at www.faqs.org/rfcs/rfc2045.html and is incorporated herein by reference.

In order for these options to be displayed in both text format and html format, the present invention converts messages to multipart/alternative or multipart/mixed as necessary.

FIG. 8 shows example message window 801 with marked up title "—NEW—test" 804 for message titled "test" from "Mathew Nelson <mat@example.com>" to "mat . . . " 805. The message is "from your friendly mail administrator" 806 and provides a help hyperlink 807 to provide help about how to handle this message.

A first option 808 provides hyperlinks for options for accepting e-mail from EXAMPLE.COM 806 810.

A second option 811 provides hyperlinks for options for rejecting e-mail from EXAMPLE.COM 809 810.

The body of the original e-mail contained only the word "test". The subject is also marked up as "—NEW—".

The hyperlink options shown above are links, which log the user in, using an encrypted password stored in a cookie. With a single click the user can decide never to receive e-mail from a spam domain again (or to accept mail from a legitimate one).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While a preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for verifying the identity of the sender of an e-mail message, the method comprising the steps of:
    receiving a client IP address for an e-mail message from an email sender;
    receiving a sender address for the e-mail message from the email sender;
    retrieving DNS information using any one of the client IP address or the sender address;
    performing a hierarchical plurality of tests on the DNS information, the hierarchical plurality of tests comprising tests having corresponding confidence values representing the degree of confidence of the sender identity;
    when one or more tests of the hierarchical plurality of tests is successful, establishing a relationship between the email sender and the email message, the relationship having the confidence value of the successful test having the highest confidence value.

2. The method according to claim 1 wherein the sender address comprises any one of an envelope sender address, a "from:" header address or a "reply to:" header address.

3. The method according to claim 1 comprising the further step of establishing the relationship between the email sender and the email message by performing a separate test, the separate test comprising attempting to compare a domain name of the sender address with a client hostname of the client.

4. The method according to claim 3 wherein the comparing the domain name of the sender address with the client hostname comprises the steps of:
    retrieving the client hostname based on the client IP address;
    retrieving one or more IP addresses based on the client hostname; and
    determining that the client IP address is one of the one or more IP addresses
    when a domain name of the client hostname equals a domain name of the sender address, establishing a relationship between the email sender and the email message.

5. The method according to claim 4 wherein any one of the client hostname or the domain name of the sender address is any one of a second level domain name or a third level domain name.

6. The method according to claim 3 wherein the performing a secondary relationship test comprises any one of a challenge response or a weighted filter.

7. The method according to claim 1 wherein the hierarchical plurality of tests comprise any one of:
    attempting to find the client IP address in the retrieved DNS information,
    attempting to find the class "C" of the client IP address in the retrieved DNS information,
    attempting to find the client hostname in the retrieved DNS information,
    attempting to find a parent domain of the client hostname in the retrieved DNS information,
    attempting to find the class "B" of the client IP address in the retrieved DNS information, or
    attempting to compare a domain name of the sender address with a client hostname of the client.

8. The method according to claim 7 wherein the hierarchical plurality of tests comprise confidence values, the confidence values comprising any one of:
    the attempting to find the client IP address in the retrieved DNS information test comprises a first confidence value,
    the attempting to find the class C of the client IP address in the retrieved DNS information test comprises a second confidence value,
    the attempting to find the client hostname in the retrieved DNS information test comprises a third confidence value,
    the attempting to find a parent domain of the client hostname in the retrieved DNS information test comprises a fourth confidence value,
    the attempting to find the class B of the client IP address in the retrieved DNS information test comprises a fifth confidence value, or
    the attempting to compare a domain name of the sender address with a client hostname of the client test comprises a sixth confidence value.

9. The method according to claim 8 comprising the further step of providing a resulting confidence value, the resulting confidence value based on any one of the first, second, third, fourth, fifth or sixth confidence value of a successful corresponding test wherein the resulting confidence value is any one of a highest confidence value of a successful test, the confidence value of a first successful test attempted or an arithmetic value derived from all of the confidence values of all successful tests attempted.

10. The method according to claim 1 wherein the tests on the DNS information comprise testing any one of "NS" DNS records, "MX" DNS records, "PTR" DNS records or "A" DNS records.

11. The method according to claim 1 wherein the plurality of tests comprise associating any one of an "IP" address, a class "B" address, a class "C" address, a hostname or a portion of a hostname.

12. The method according to claim 1 when the plurality of tests performed are unsuccessful, performing the further step of any one of accepting the e-mail, delaying the e-mail, rejecting the e-mail or performing a secondary relationship test.

13. The method according to claim 1 comprising the further steps of:
    presenting the e-mail message to a recipient;
    presenting SPAM management GUI options to the recipient wherein the SPAM management GUI options comprise any one of: an e-mail address of the sender, a client's IP address, a client's hostname, an e-mail address contained in the e-mail message, one or more blacklist tags, one or more whitelist tags or one or more sender rank tags.

14. The method according to claim 13 wherein any one of the GUI options is based on an item, a portion of the item, or a pattern derived from the item, wherein the item is any one of the e-mail address of the sender, the client's IP address, the client's hostname or an e-mail address contained in the e-mail message.

* * * * *